US011932525B2

(12) United States Patent
Schiavi et al.

(10) Patent No.: US 11,932,525 B2
(45) Date of Patent: Mar. 19, 2024

(54) AUTOMATIC GUIDED VEHICLE FOR HANDLING REELS AND RELATED CONTROL METHOD

(71) Applicant: OCME S.R.L., Parma (IT)

(72) Inventors: Giovanni Schiavi, Parma (IT); Luigi Cerinelli, Parma (IT); Giuliano Maccherozzi, Parma (IT)

(73) Assignee: OCME S.R.L., Parma (IT)

( * ) Notice: Subject to any disclaimer, the term of this patent is extended or adjusted under 35 U.S.C. 154(b) by 188 days.

(21) Appl. No.: 17/704,214

(22) Filed: Mar. 25, 2022

(65) Prior Publication Data

US 2022/0332555 A1 Oct. 20, 2022

(30) Foreign Application Priority Data

Apr. 14, 2021 (IT) ........................ 102021000009353

(51) Int. Cl.
*B66F 9/075* (2006.01)
*B66F 9/06* (2006.01)
*B66F 9/14* (2006.01)

(52) U.S. Cl.
CPC ............ *B66F 9/0755* (2013.01); *B66F 9/063* (2013.01); *B66F 9/142* (2013.01)

(58) Field of Classification Search
CPC .... B66F 9/18; B66F 9/16; B66F 9/146; B66F 9/143; B66F 9/063; B66F 9/0755
See application file for complete search history.

(56) References Cited

U.S. PATENT DOCUMENTS

2013/0259618 A1* 10/2013 McGrane ................ B66F 9/143 414/671
2018/0319594 A1 11/2018 Blevins et al.
(Continued)

FOREIGN PATENT DOCUMENTS

CN 108584803 A * 9/2018
CN 108584803 A 9/2018
(Continued)

OTHER PUBLICATIONS

Italian Search Report dated Jan. 18, 2022 in Italian Application 102021000009353 filed on Apr. 14, 2021, citing documents AA & AO-AQ therein, 11 pages (with English Translation of Categories of Cited Documents & Written Opinion).

*Primary Examiner* — Kaitlin S Joerger
(74) *Attorney, Agent, or Firm* — Oblon, McClelland, Maier & Neustadt, L.L.P.

(57) ABSTRACT

An automatic guided vehicle for handling reels includes a telescopic upright integral with a vehicle frame bearing a fork carriage provided with at least one pair of forks and connected to the telescopic upright with an equipment. The equipment includes a plurality of actuators and a plurality of sensors, the equipment including a pair of actuators for tilting the fork carriage, an actuator to control the global lateral translation of the fork carriage, at least one pair of actuators for the symmetrical movement of the forks towards and away from each other. Each fork has a substantially rectangular section with a height greater than the base. Opposite facing walls of the forks are flat and can be approached in direct contact with each other, the two coupled forks having bevels along all the four edges facing outwards. Each fork can have a "V" shaped seat on the upper face.

16 Claims, 13 Drawing Sheets

(56) References Cited

U.S. PATENT DOCUMENTS

| | | | | |
|---|---|---|---|---|
| 2022/0332555 | A1* | 10/2022 | Schiavi | B66F 9/063 |
| 2022/0375206 | A1* | 11/2022 | Onoda | G06V 20/60 |
| 2023/0073066 | A1* | 3/2023 | Chien | B66F 9/18 |

FOREIGN PATENT DOCUMENTS

| | | | | |
|---|---|---|---|---|
| JP | 07-315785 | A | | 12/1995 |
| JP | H07315785 | A | * | 12/1995 |
| WO | WO 91/08164 | A1 | | 6/1991 |

* cited by examiner

AUTOMATIC GUIDED VEHICLE FOR HANDLING REELS AND RELATED CONTROL METHOD

The present invention relates to an automatic guided vehicle for handling reels and a related control method.

Laser-guided vehicles, hereafter referred to alternatively as LGVs, are used to handle load units, comprising loads such as reels, or goods on pallets as an alternative to manually operated forklifts.

In order to optimize the handling operations of the load units within predefined areas in the absence of operators, automatic guided vehicles are able to autonomously pick up a pre-determined load placed in a particular area to transfer it and deposit it, again autonomously, in another predefined area, which can be identified on a shelf of a specific storage shelving.

The shelves of such storage shelving are suitably sized to allow pallets with goods and/or similar loads to be placed on top of the shelf itself.

In the case of reels laid out, they must be handled in the following two configurations:

- Reel with unknown diameter arranged longitudinally to the vehicle. This product will be stored directly on a V-shaped cradle which ensures the correct positioning of the reel in the lateral direction.
- Reel with an unknown diameter, raised from the ground and supported by a support pole inserted in the core of the reel itself, arranged transversely to the vehicle. This product will be stored on a pair of V-centered supports for the pole, which ensure the correct positioning of the reel in the longitudinal direction on a warehouse shelving.

The main difficulties in this application are coordinating the two modes of picking and switching from one to the other.

Moreover, in both cases, reliability and efficiency must be ensured despite the very small tolerable margins of error.

Particularly critical is the working condition in which the reels are made of relatively expensive materials, i.e., when contact with the external surface of the load units must be limited so as not to damage them, and when working with reels with a diameter of less than 300 mm.

The object of the present invention is to make an automatic guided vehicle for handling reels and a related control method capable of reliably and repeatably handling reels laid out indifferently according to the two different configurations.

A further object of the present invention is to make an automatic guided vehicle for handling reels and a related control method which allows switching from one handling configuration to another in a fully automatic manner.

These objects according to the present invention are achieved by making an automatic guided vehicle for handling reels and a related control method as set forth in the independent claims.

Further features are comprised in the dependent claims.

The features and advantages of an automatic guided vehicle for handling reels and a related control method according to the present invention will be more apparent from the following description, which is illustrative and not limiting, referring to the accompanying schematic drawings in which:

FIG. 1 schematically shows a first load unit consisting of a reel resting on a centering cradle to be picked up by the automatic guided vehicle object of the present invention longitudinally with respect thereto;

FIG. 2 schematically shows a second load unit comprising a reel arranged raised from the ground and placed on a shelving structure, or rack, to be picked up by the automatic guided vehicle of the present invention arranged transversely with respect thereto;

Figure 5:
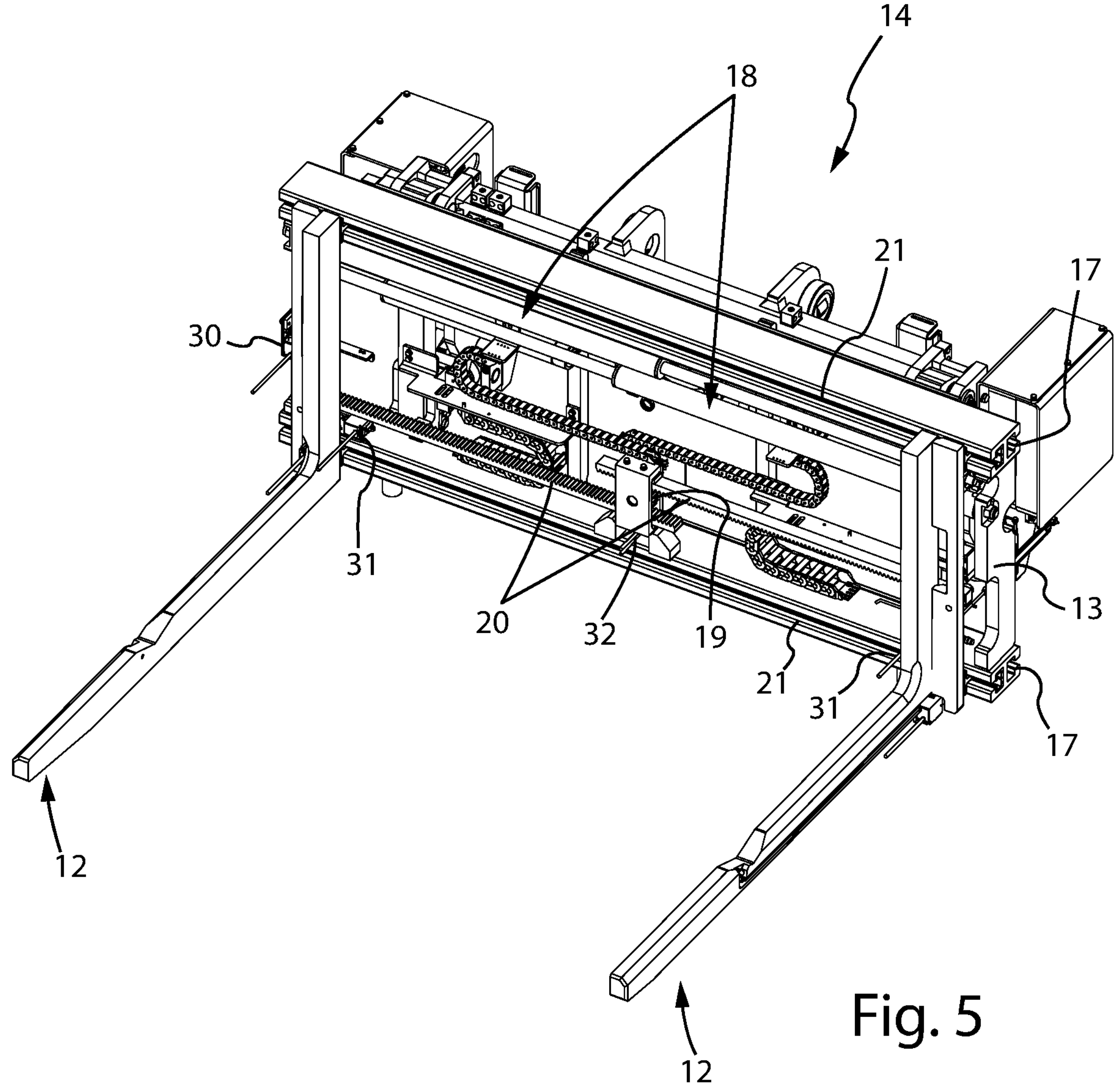
Figure 6:
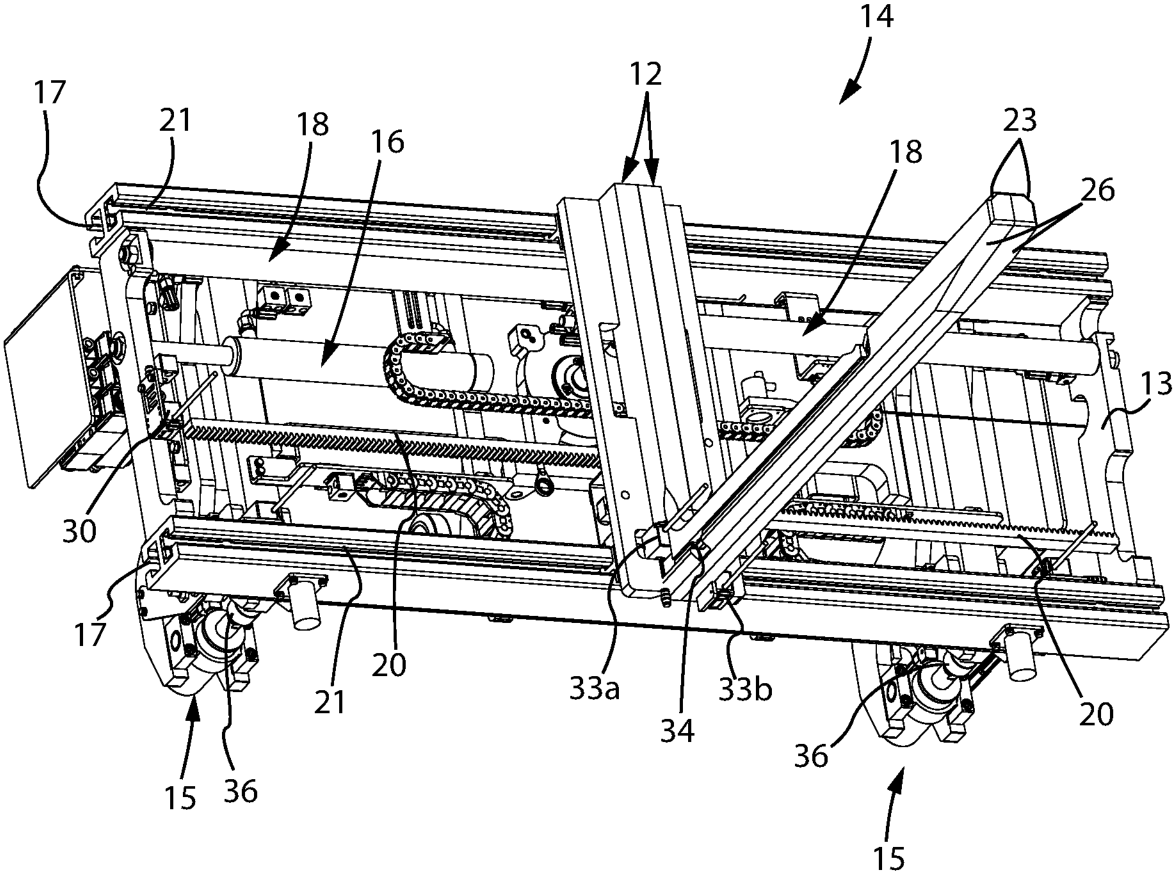
Figure 7:
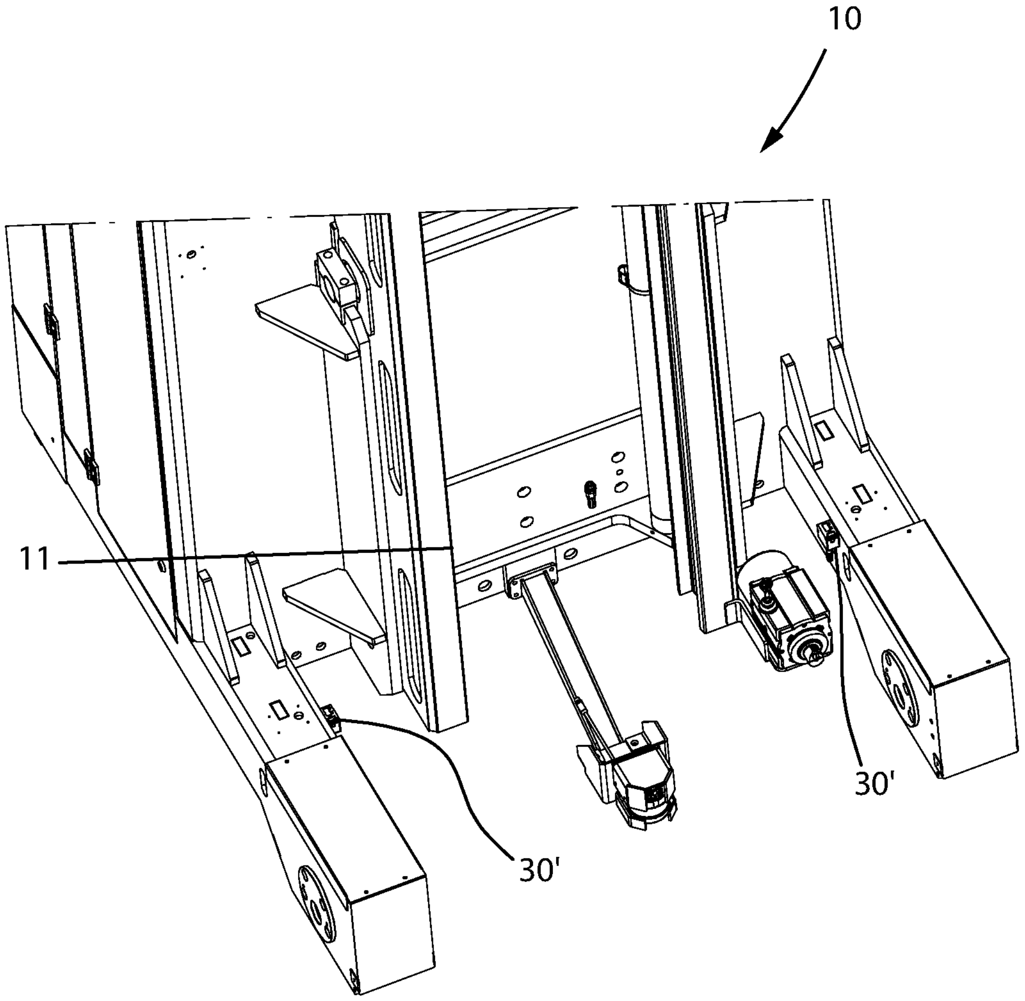
Figure 8:
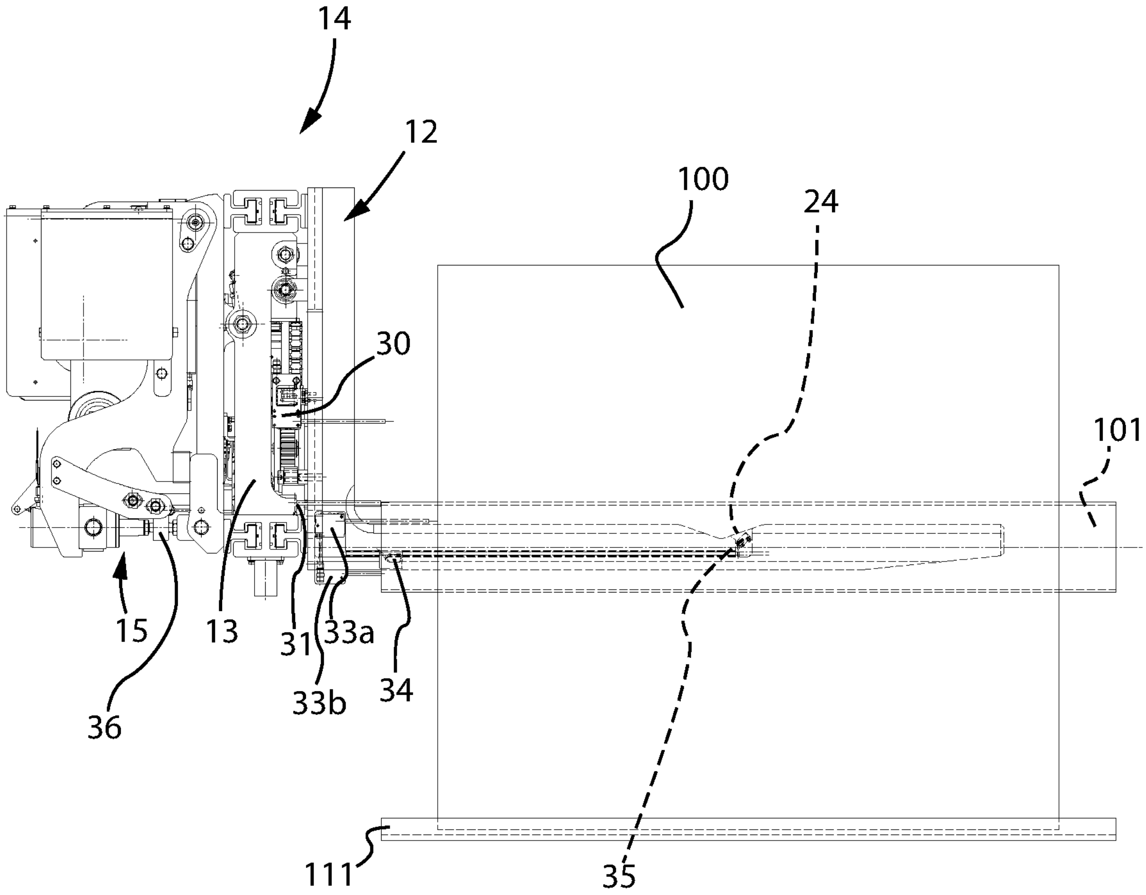
Figure 9:
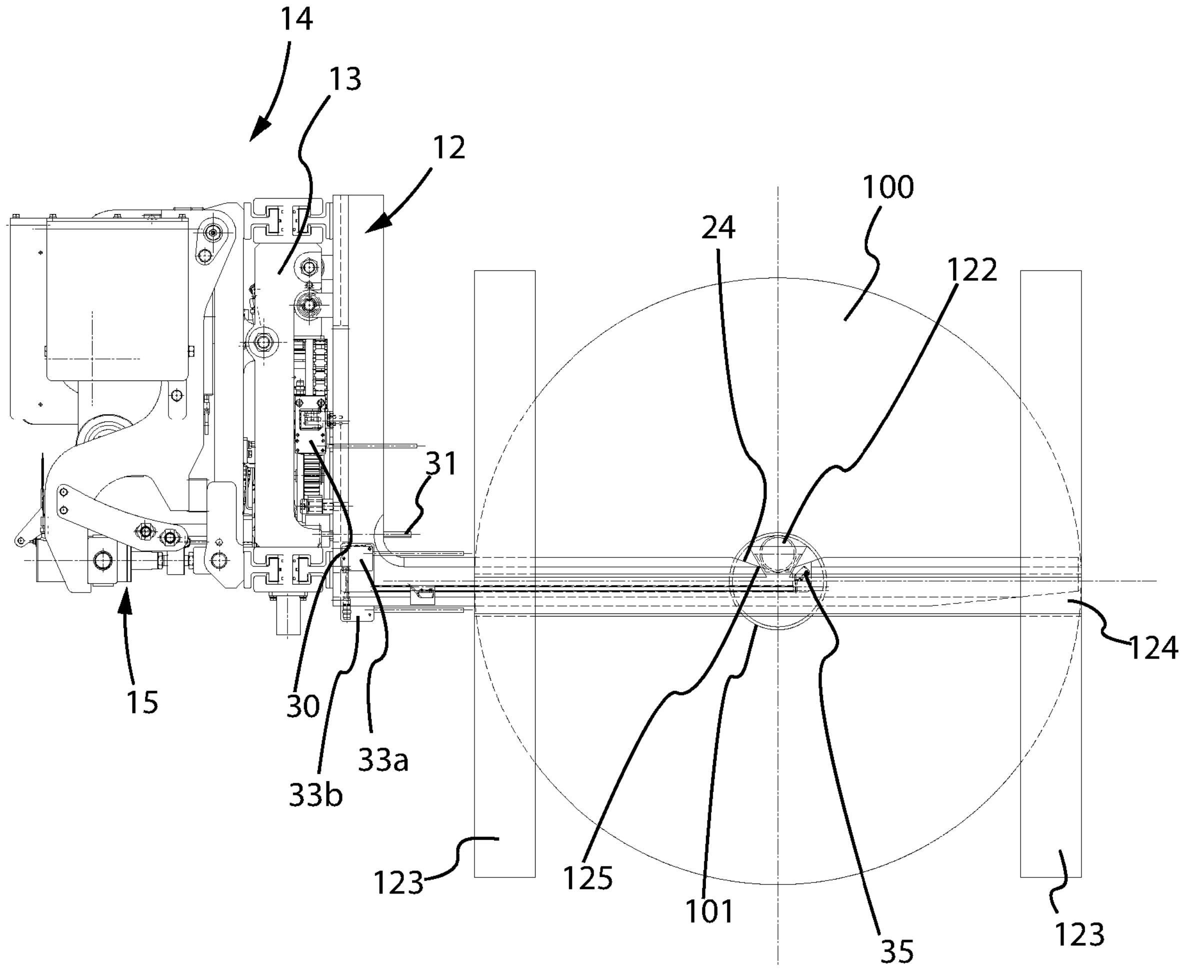
Figure 13:
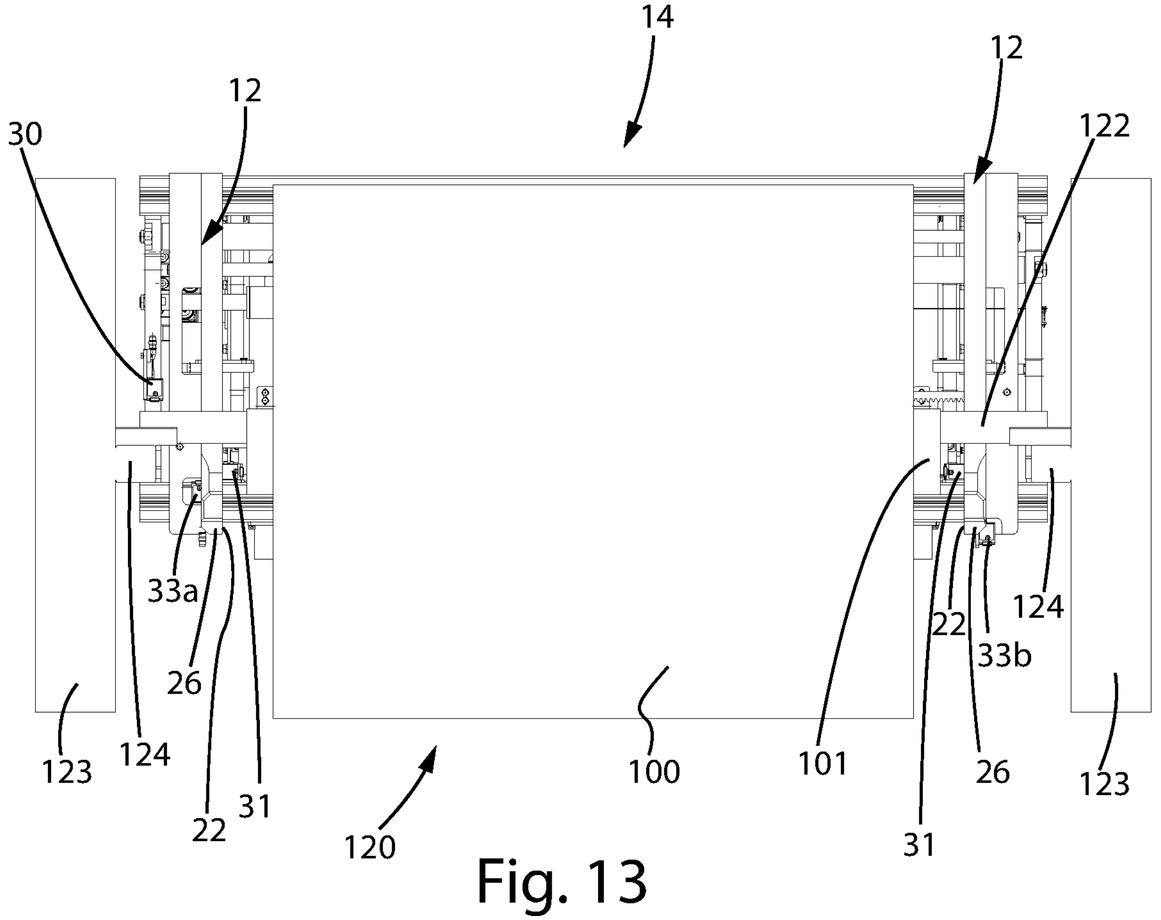
Figure 14A:
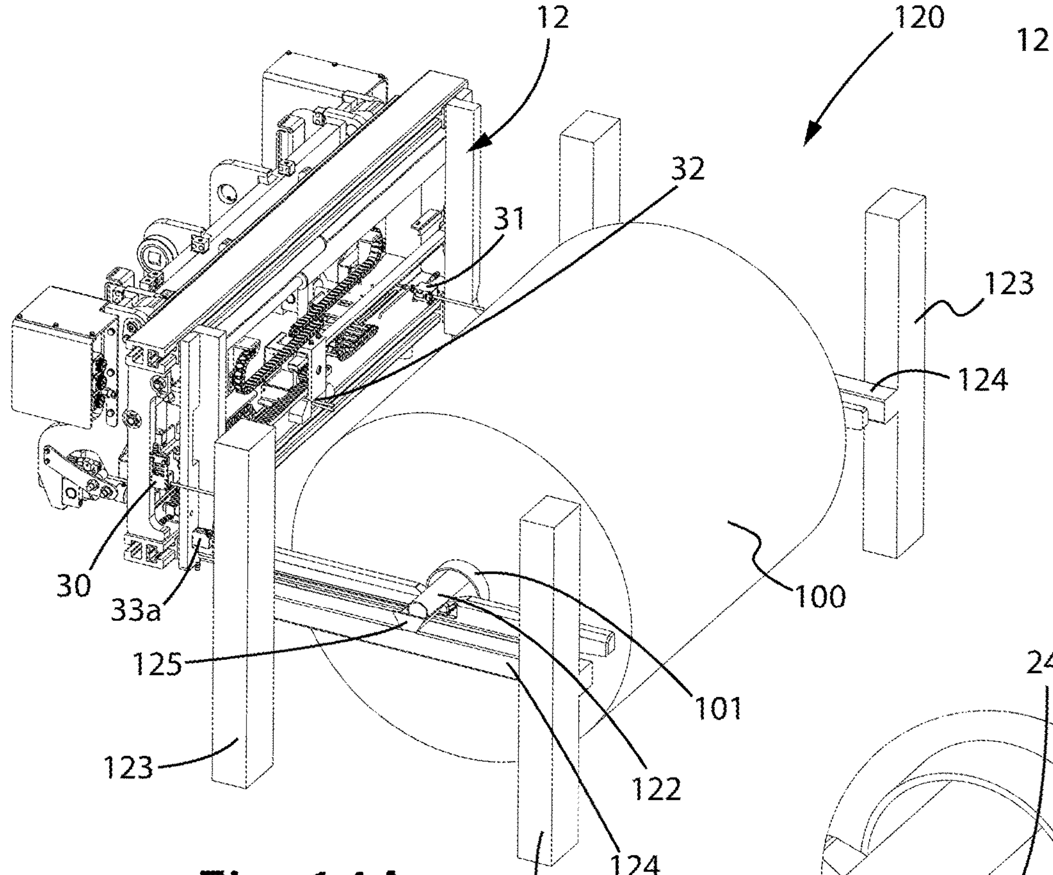
Figure 14B:
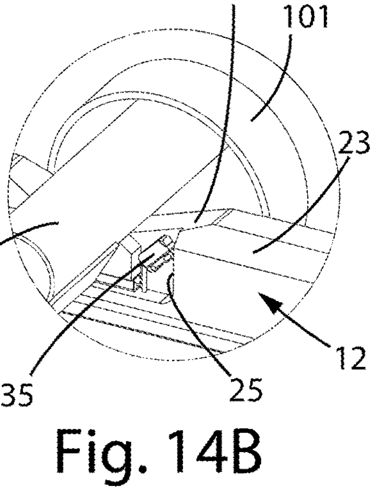

FIGS. 5 and 6 respectively show the fork carriage of the vehicle according to the invention with the pair of forks in the open position and in the closed position;

FIG. 7 shows a detail of the pair of lateral fork sensors mounted on the vehicle frame;

FIGS. 8 and 9 show the target pick-up/deposit positions of the first and second load units, respectively;

FIGS. 10, 11A, 11B, and 12 show the automatic guided vehicle according to the present invention when handling a reel in a longitudinal configuration;

FIGS. 13, 14A, and 14B show the automatic guided vehicle according to the present invention when handling a reel in a transversal configuration.

With reference to the figures, an automatic guided vehicle, overall indicated with 10, for handling reels 100 is shown.

Figure 1:
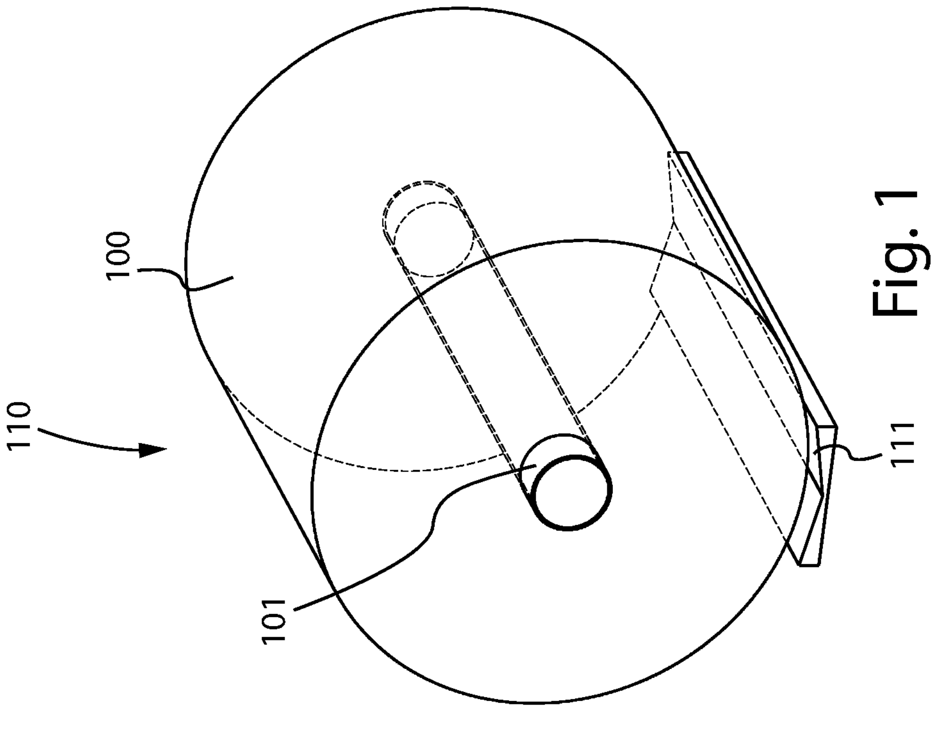

A first load unit 110, shown in FIG. 1, comprises the reel 100 resting on a centering cradle 111 parallel to the axis of the reel 100 adapted to be picked up by the automatic guided vehicle 10 arranged longitudinally with respect thereto.

Figure 2:
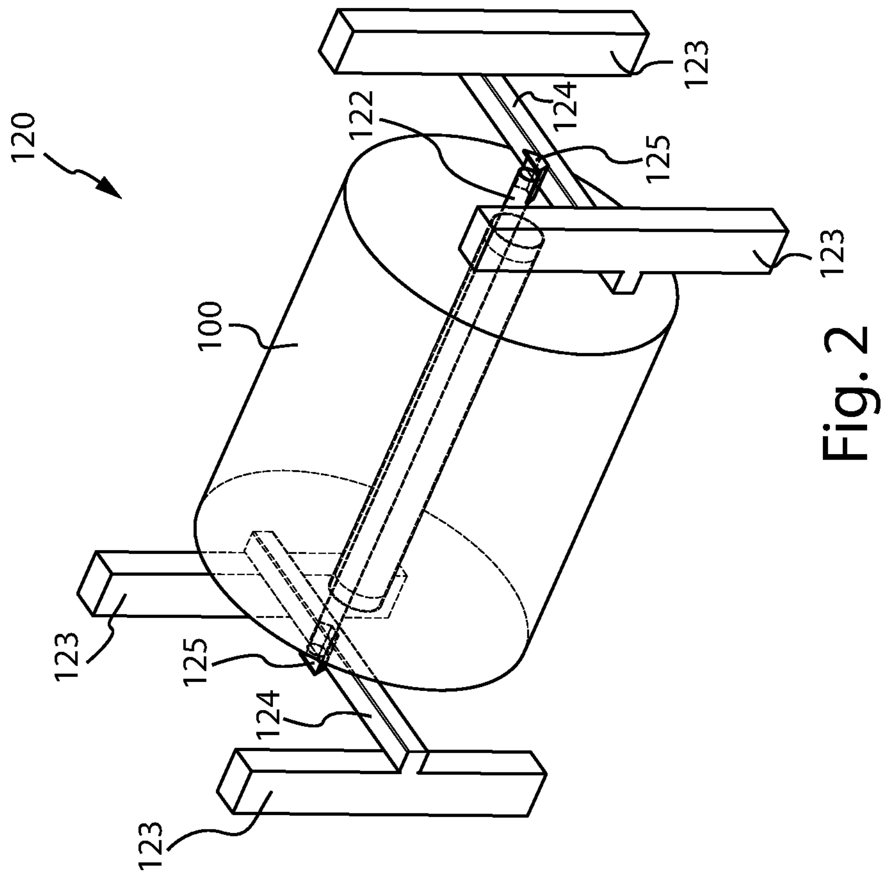

A second load unit 120, shown in FIG. 2, comprises the reel 100 maintained raised above the ground and adapted to be picked up by the automatic guided vehicle 10 arranged transversely with respect thereto. In the second load unit 120, the reel 100 is positioned on a shelving structure, or rack, 121 supporting a support pole 122 inserted in a core 101 of the reel 100. The shelving structure 121 comprises vertical uprights 123, bearing horizontal shelves 124 provided with a V-shaped centring device 125 for the correct positioning of the support post 122 on the shelving structure 121.

Figure 3:
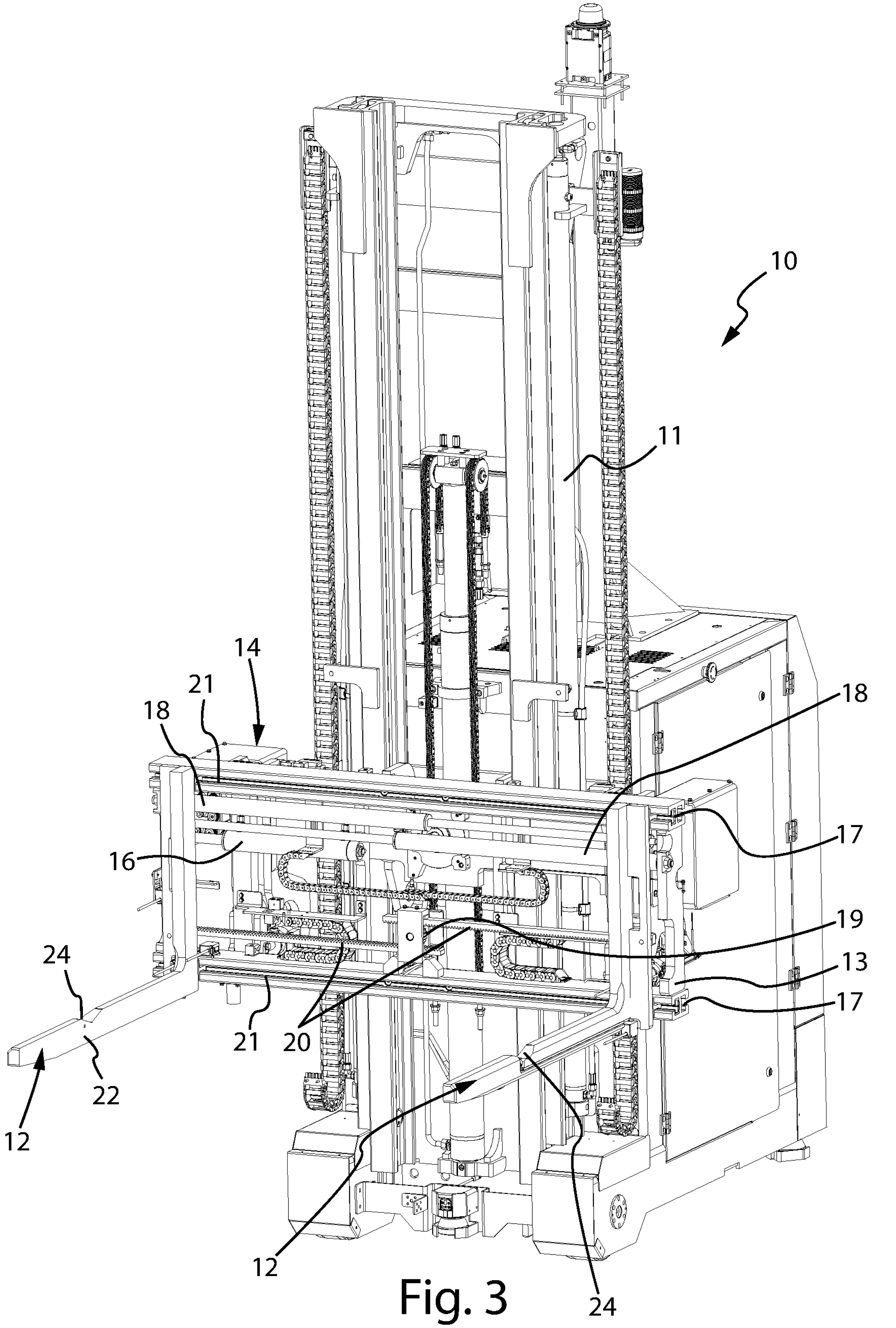
FIG. 3 is a perspective view of an automatic guided vehicle for handling reels according to the present invention.

The automatic guided vehicle 10 comprises a telescopic upright 11 integral with a vehicle frame 10 and bearing a fork carriage 13 provided with one or more pairs of forks 12 (FIG. 3).

An equipment 14 is interposed between the fork carriage 13 and the upright 11, which controls the essential movements of the forks 12, namely the tilting of the fork carriage 13, the global translation of the fork carriage 13 and the symmetrical positioning of the pair of forks 12.

The equipment 14 comprises a plurality of actuators and relative support plates, as well as a plurality of photocells for detecting the environment surrounding the forks and a plurality of sensors for detecting the position of the forks 12 and thereby controlling said essential movements of the forks 12.

The equipment 14 comprises a pair of actuators 15, preferably cylinder actuators, articulated at opposite sides of the fork carriage 13 and acting in a plane orthogonal to the lifting plane of the forks 12, identified by the telescopic uprights 11, to change the inclination of the forks 12 with respect to the ground. The tilting movement is used to recover the flexion of the forks 12 when transporting loads with high mass.

The equipment 14 comprises an actuator 16, preferably a cylinder actuator, connected between the upright 11 and the fork carriage 13, to control the overall translation of the fork carriage 13 laterally along straight guides 17 in the lifting plane of the forks 12.

The equipment 14 further comprises a pair of actuators 18, preferably cylindrical actuators, each connected between the upright 11 and a respective fork 12, for symmetrically moving the forks 12 towards and away from each other in the lifting plane of the forks 12.

According to an embodiment shown in the figures, by way of non-limiting example, the two forks 12 are mechanically connected by means of a pinion 19 and a rack 20 so as to obtain the movement of the forks in mutual approach and distancing with a perfectly symmetrical positioning. Alternatively, the symmetrical positioning can be achieved by an independent movement of the forks.

The movement of the individual forks 12 in relation to the fork carriage 13, when approaching and moving away from each other, occurs along straight guides 21, which are parallel to each other and lie in the lifting plane of the forks.

Figure 4A:
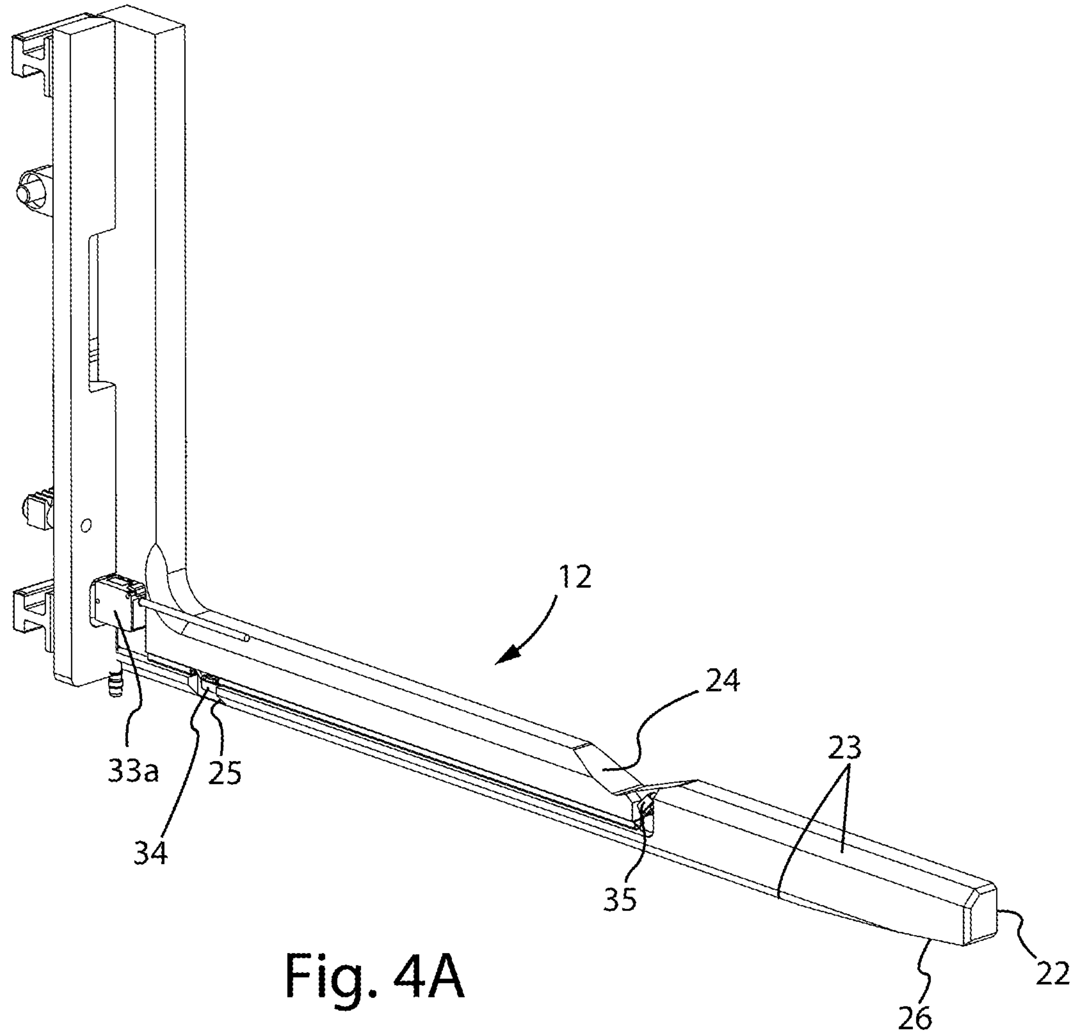
FIGS. 4A and 4B are respectively a perspective view and a transversal section of a fork of the automatic guided vehicle according to the invention.
Figure 4B:
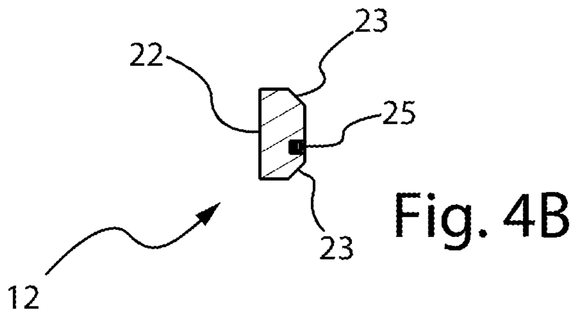

The automatic guided vehicle 10 according to the present invention, has a pair of forks 12 having a specific profile designed to perform both the operations of picking up the reel 100 with unknown diameter, arranged longitudinally to the vehicle on a cradle 111, and the operations of picking up the reel 100 with unknown diameter, arranged transversely to the vehicle raised from the ground and supported by the pole 122 positioned on the shelving structure 121 (FIGS. 4A and 4B).

According to the invention, each fork 12 has a substantially rectangular section with a height significantly greater than the base, preferably twice the height with respect to the base.

Opposite facing walls 22 of the forks 12 are flat and approachable in direct contact with each other, so that the two joined forks 12, in a fully closed configuration, are inserted into the core 101 for handling the reel 100 in the first load unit 110 and behave as if they were a single fork.

Moreover, each fork 12 bears only on its outer wall two bevelled edges 23, while the wall facing 22 the other fork bears no bevelled edges. When the pair of forks 12 is in a juxtaposed configuration, i.e., forming a single compound fork, the joined forks 12 have bevels 23 along all the four outward facing edges to facilitate the forking.

The profile of the forks 12 is such as to ensure a margin of about 25 mm in each direction, both laterally and vertically, with respect to the hole of the core 101 of the first load unit 110 to be forked for handling.

The handling of the reel 100 in the configuration 120 is instead performed with the forks 12 of the pair of forks in an open configuration, i.e., separated from each other, and each gripping on opposite sides of the reel 100 on the support pole 122.

According to the invention, each fork 12 has on its upper face a "V" shaped seat 24 as an invitation for the pole 122 of the second load unit 120.

In order to grip the pole 122, the forks 12 will be positioned with an opening established by software in order to have a lateral margin of at least 35 mm for forking the second load unit 120.

According to the invention, switching from one configuration to another is fully automatic and managed by the vehicle, without the need for operator intervention.

Furthermore, along each of the forks 12, seats 25 are included for the sensors and photocells embedded in the forks 12 so as not to create additional protruding space with respect to the profile of the forks 12.

Preferably, a tapered tip portion 26 is included on the lower face of each fork 12, which accomplishes a lightening without however compromising the flexion of the forks and facilitates the forking of the second load unit 120.

This dimensioning of the two forks 12 which can be placed side by side advantageously allows to reconcile structural and geometric requirements. In fact, knowing the weight of the maximum load, it is necessary to ensure a correct flexion value and to verify the tensional state, with the appropriate safety coefficients. Furthermore, given the size of the load units available for fork entry, it is necessary to ensure sufficient margins to ensure the correct operation of all the sensors, particularly during the deposit and picking operations.

The automatic guided vehicle 10 further comprises a plurality of photocells preferably placed on the equipment 14 or on the forks 12, shown in FIGS. 5 and 6 to control the correct operation of the picking and depositing cycles of the two different load units 110, 120.

At least one lateral photocell 30, 30', preferably of the laser distance measuring type, verifies the positioning of the fork carriage 13 with respect to the shelving 121. The lateral photocell 30, 30' is used to check that the fork carriage 13 is in the correct position in the lateral direction in relation to the shelving. The at least one lateral photocell 30, 30' is placed on board the fork carriage 13 or the vehicle frame 10 depending on the geometry of the shelving and the load units to be handled, in an external lateral position with respect to the forks 12.

FIGS. 5 and 6 show, for example, a lateral photocell 30 installed on board the fork carriage 13 and therefore movable in height therewith. FIG. 7 shows a pair of lateral sensors 30' installed on board a frame of a vehicle 10 in a fixed height position.

A pair of photocells for checking the shape of a transversal reel 31, is located in the lower area of the fork carriage 13, integral with the latter or with the forks 12, and is front-facing.

These are preferably laser distance measuring photocells used to verify the correct position of the reel 100 on its pole 122 in the second load units 120.

A reading photocell for reading the transversal reel diameter 32, is positioned in the center of the equipment 14 and facing outwards. This is preferably a laser distance measuring photocell used to measure the diameter of the second load unit 120, when it is positioned in the special V seat 24 of the forks 12.

At the base of each fork 12, on the external face and facing frontally in a direction parallel to the extension of the fork, a photocell for core searching 33*a*, 33*b* of the first load unit 110 is integrally fixed. It is preferably a laser distance measuring photocell.

The two photocells 33*a*, 33*b* are preferably arranged, one at the upper face of the forks 12 and the other at the lower face of the forks 12, substantially in diagonal positions with respect to each other when looking at the front of the forks 12 placed side by side, i.e., in a closed position.

The photocells for core searching 33*a*, 33*b* read the hole of the core 101 of the reel 100 of the first load unit 110, when the forks 12 are fully closed.

On the lower face of at least one of the two forks 12, near the base thereof, a photocell is positioned for detecting the forked core 34 of the reel 100 of the first load unit 110. It is preferably a direct reflection photocell which reads in a vertical downward direction. It is used to check that the first load unit 110 has been forked correctly up to the stroke end by the forks in the closed position.

Photocells for pole detection 35, which detect the presence of the pole 122 in the V seat 24 of the forks 12, for the second load unit 120 with transversal reel are placed on both forks 12 facing upwards at the V seat 24.

A pair of load cells 36 is placed on board the equipment 14 between the fork carriage 13 and the actuators 15 for tilting the plate 13 (FIGS. 6 and 8).

The load cells 36 are used for:

Checking the presence of the load on the forks 12, for both types of load.

Checking that the load on the forks 12 does not exceed the maximum permitted value.

End of unloading mission signal for the second load unit 120 when the deposit is completed.

End of unloading mission signal for the first load unit 110 and checking that the forks 12 are not resting on the lower part of the core 101 of the reel 100.

Known sensors (encoders) are also installed on board the equipment 14 of the automatic guided vehicle 10 to measure the position of the equipment 14 at all times. In particular, the following positions should be noted:

Fork 12 height from the ground,

Zero tilt angle height,

Maximum tilt angle height,

Lateral transversal height of the entire fork carriage 13,

Opening and closing height of the forks 12.

In the automatic guided vehicle 10 according to the invention, a step of switching from a configuration for handling a longitudinal reel 100 in the first load unit 110 to a configuration for handling a transverse reel 100 in the second load unit 120 is implemented by automatically bringing the forks 12 from a closed position, with the forks side by side in contact with each other, to an open position, with the forks separated at the distance for gripping, and vice versa.

The automatic guided vehicle 10 according to the invention performs four different types of movements:

a) Picking first load unit 110 (longitudinal reel), comprising the calculation of the reel diameter.

b) Depositing first load unit 110 (longitudinal reel).

c) Picking second load unit 120 (transverse reel), comprising the calculation of the reel diameter.

d) Depositing second load unit 120 (transverse reel).

All the handling operations of the equipment 14 are controlled by the vehicle software, in a currently known manner, through the sensors for measuring the position of the equipment 14 in every moment.

All the types of handling use sensors installed on board the vehicle to align the equipment 14 and/or forks 12 to each individual tunnel for each operation.

For all of the described handlings, the automatic guided vehicle 10 according to the invention is placed in a known manner by means of the laser guidance system of the vehicle, which has the plant as a reference, in a so-called "target position", i.e., in a position with the equipment in the correct longitudinal and lateral position for performing a picking or depositing operation.

FIGS. 8 and 9 respectively depict the target pick-up and deposit positions of the first load unit 110, in which the forks 12 in the closed position are forked in the core 101 up to the end stroke, and of the second load unit 120 in which the pole 122 is housed in the V-shaped seats 24 of the forks 12.

The picking cycle of the first load unit 110 performed by the vehicle 10 in automatic mode (cycle a)) comprises the following steps:

The vehicle 10 lifts the forks 12, with zero tilt angle and the forks 12 fully closed, to a predefined height as a function of the height of the deposit plane, which is higher with respect to the maximum theoretical value.

A vertical search of the hole of the core 101 is first carried out by operating the lifting cylinders of the fork 12 and detecting the variation in the signal provided by the photocells for core searching 33*a* and 33*b*.

Then, a search for the hole of the core 101 is carried out horizontally by operating the actuator 13 of the global translation of the plate 13 and detecting the variation of the signal provided by the photocells for core searching 33*a* and 33*b*.

Figure 10:
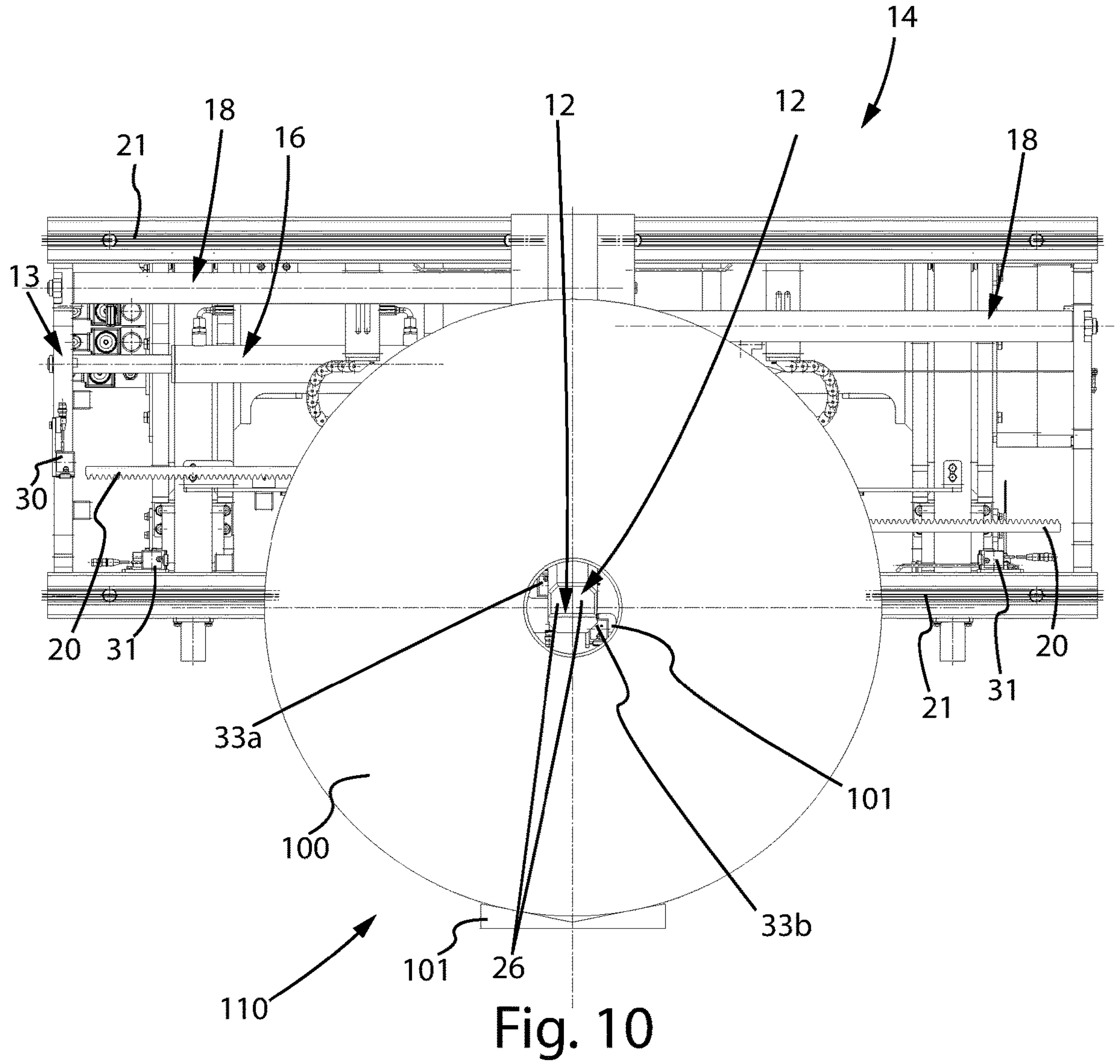

It was thus verified with certainty that both the photocells for core searching 33*a* and 33*b* were in the light inside the core 101 of the reel 100 (FIG. 10).

When both photocells for core searching 33*a*, 33*b* are in the light, the vehicle 10 enters the bay by inserting the joined forks 12 in the core 101 of the reel 100.

Figure 11B:
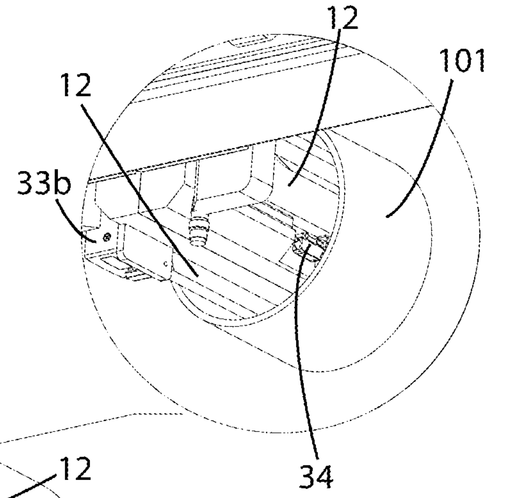
Figure 11A:
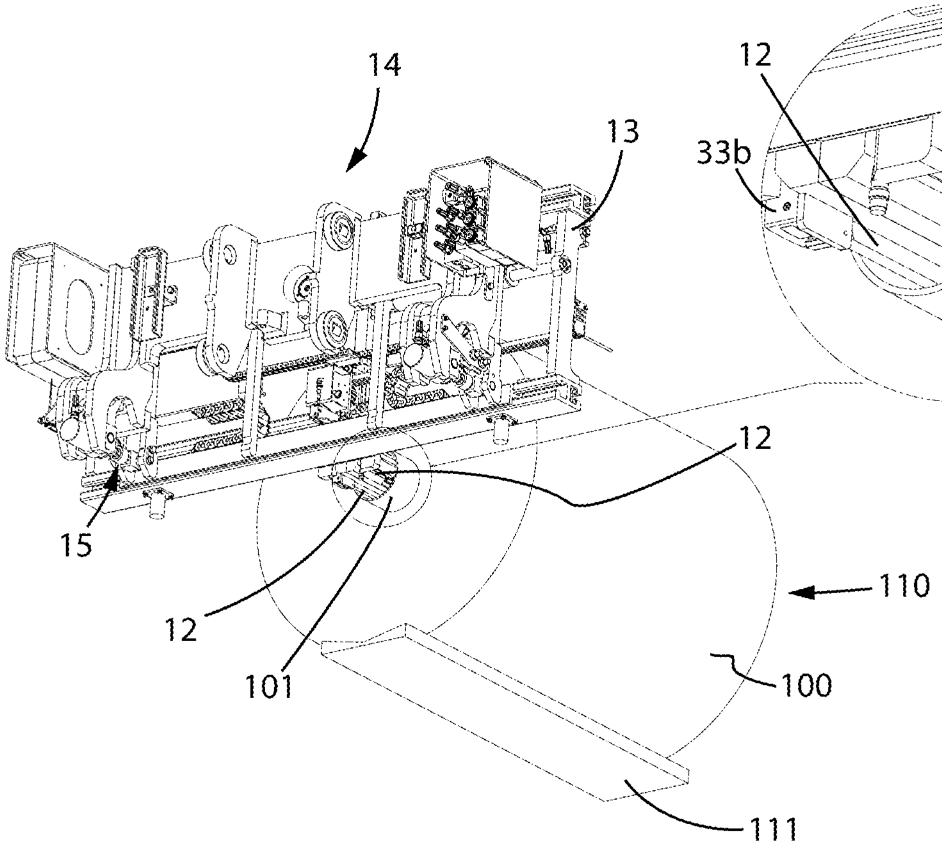

The slow-down and end-of-picking event will occur when the photocell for detecting the forked core 34, embedded in the fork 12 enters the reel 100. After a certain offset from such a slow-down event, the stop event will occur (FIGS. 11A and 1B).

The vehicle 10 saves the equipment height.

The calculation of the diameter of the reel of the first load unit 110 arranged longitudinally with respect to the vehicle 10 is performed during the picking operation, after having identified the hole of the reel core with the photocells for core searching 33*a*, 33*b*. Therefore, if the height of the forks 12 in the indicated position (measured dynamically with a wire encoder) and the height and geometry of the support surface (constant for the application) are known, the diameter of the first load unit 110 can be calculated.

Figure 12:
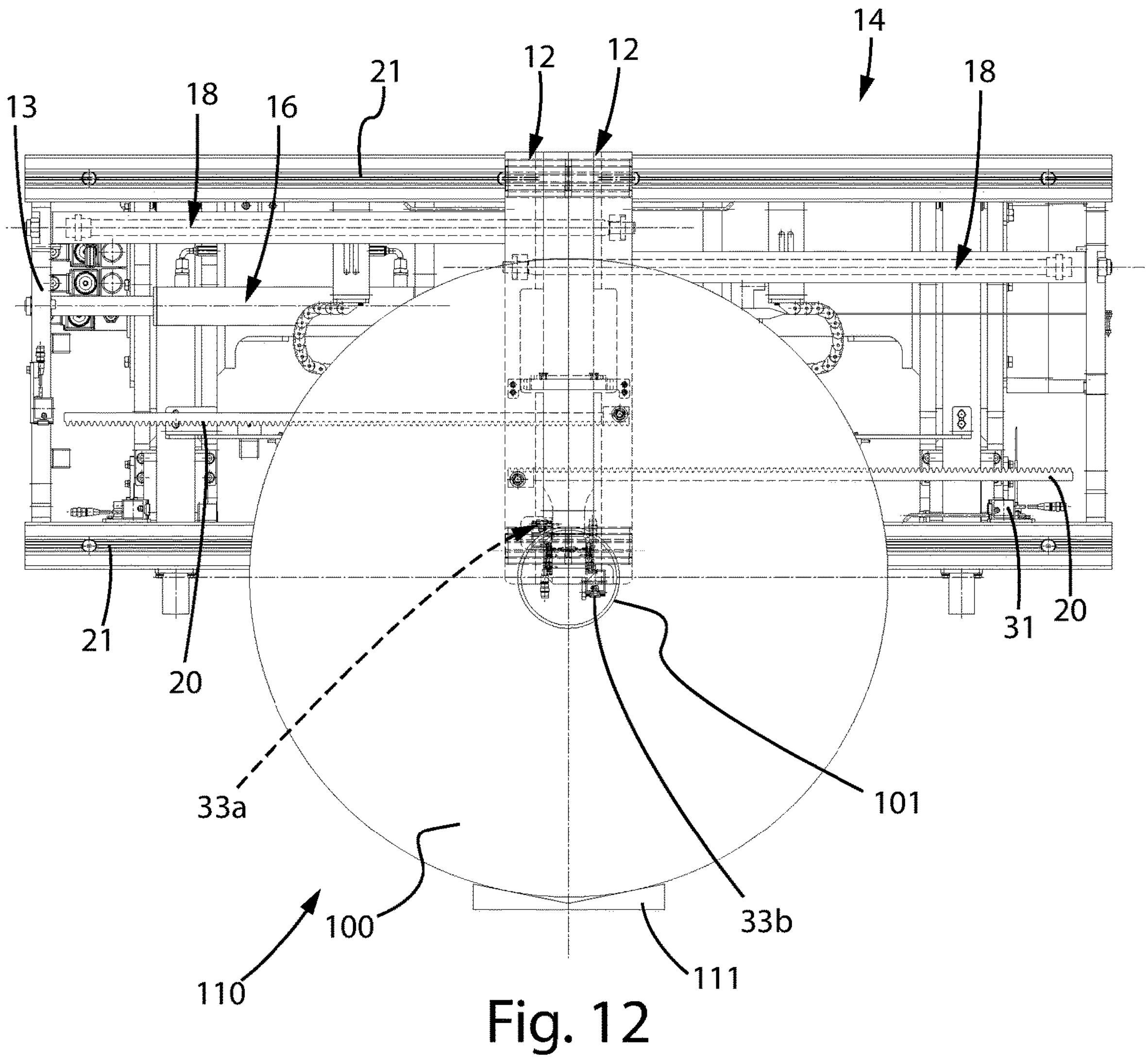

The deposit cycle of the first load unit 110 carried out by the vehicle 10 in automatic mode (cycle b)) comprises the following steps:

When the vehicle 10 is near the target, it raises the forks 12, with zero tilt angle and the forks 12 fully closed, to such a height as to check for the presence of other reels 100 in the designated location for deposit with the photocell for core searching 33*b*. When the load is on the forks 12, the photocell for core searching 33*b* is in the light (the beam passes inside the core of the reel, but is not obscured by anything) and can therefore detect the presence of any obstacles (FIG. 12).

If no abnormal obstacle is detected, the vehicle 10 moves the forks 12 to the deposit height.

The vehicle 10 moves forward to position itself on the target and lowers the forks 12 until the photocell for core searching 33*a* and/or no longer senses the reel with the load cells 36, based on the specific features of the load.

The picking cycle of the second load unit 120 carried out by the vehicle 10 in automatic mode (cycle c)) comprises the following steps:

The vehicle 10 approaches the picking location with the forks 12 at the correct height to perform the operation, zero tilt and suitable opening of the forks 12. The height from the ground after acquiring the drawing of the shelving 121 will be constant for the application, in particular it will not vary according to the diameter of the reel 100.

The vehicle 10 stops outside the target and searches for the vertical upright 123 of the warehouse by virtue of the left and right translation of the fork carriage 13 and the lateral photocell 30. After which it centers the equipment 14 with respect to the warehouse compartment under consideration. More specifically this operation, which is carried out with the vehicle 10 stationary, consists of moving the equipment 14 completely to the left until it reads the upright 123 of the warehouse with the aforementioned photocell 30. Thereby, knowing the translation height of the fork carriage 13, it is possible to calculate the position of the vehicle 10 in relation to the center of the loculus.

After the equipment 14 has been correctly positioned, the photocells for checking the transversal reel shape 31 are used to check the position of the reel 100 with respect to the pole 122 supporting it. For a positive result is is necessary that both photocells for checking the transversal reel shape 31 are "in the light", i.e., they do not detect the reel 100 or its core 101 (FIG. 13).

Vehicle 10 drives to the target and lifts the forks 12, picking up the reel 100 and the pole 122.

The confirmation that the reel 100 has been taken over is provided by the photocells for pole detection 35 which read the presence of the pole 122 in its V seat 24 and/or the load cells 36 which detect the weight of the object (FIGS. 14A and 14B).

If necessary, the vehicle 10 will tilt upwards.

The calculation of the diameter of the reel of the second load unit 120 arranged transversely with respect to the vehicle 10 is carried out at the end of the picking operation. Knowing the distance of the reel axis from the shoulder of the forks (constant because the product axis is always at the V-shaped seat 24 on the forks 12), the distance of the reel circumference is measured with the photocell for reading the transverse reel diameter 32 and the diameter is calculated.

The deposit cycle of the second load unit 120 carried out by the vehicle 10 in automatic mode (cycle d)) comprises the following steps:

The vehicle 10 approaches the picking location with the forks 12 at the correct height to perform the operation and zero tilt and suitable opening of the forks 12. The height from the ground after acquiring the drawing of the shelving 121 will be constant for the application, in particular it will not vary according to the diameter of the reel 100.

The vehicle 10 stops outside the target and searches for the upright 123 of the warehouse by virtue of the translation of the fork carriage 13 and the photocell 30, 30'. After which it centers the equipment 14 with respect to the storage compartment under consideration in a similar way to the picking operation.

The vehicle 10 checks for the presence of any other load units 120, and in particular of the pole, at the location by bringing the equipment to a height where the presence of a pole 122 in the deposit location can be read by the photocell 33*b*.

If no obstacle is detected, the vehicle 10 advances until it reaches the target.

The vehicle 10 completes the operation of depositing the second load unit 120 by lowering the vertical height of the forks 12. The end of the operation is verified with the photocells for pole detection 35 which no longer read the presence of the pole 122 and/or the load cells 36 which no longer sense the weight of the object.

The automatic guided vehicle for handling reels and a related control method object of the present invention has the advantage of allowing the passage from handling reels in a longitudinal configuration to handling reels in a transverse configuration in a fully automatic manner with the same equipment.

The automatic guided vehicle for handling reels and a related control method thus devised is susceptible to numerous modifications and variants, all of which are within the scope of the invention; furthermore, all the details can be replaced by technically equivalent elements. In practice, the materials used, as well as their dimensions, can be of any type according to the technical requirements.

The invention claimed is:

1. An automatic guided vehicle for handling reels comprises a telescopic upright integral with a vehicle frame bearing a fork carriage provided with at least one pair of forks and connected to the telescopic upright with an equipment, wherein the equipment comprises a plurality of actuators and a plurality of sensors, the equipment comprising a pair of actuators for tilting the fork carriage, an actuator to control the global lateral translation of the fork carriage and at least one pair of actuators for the symmetrical movement of the forks towards and away each other, wherein each fork of the pair of forks has a substantially rectangular section with a height greater than the base, wherein opposite facing walls of the forks are flat and can be approached in direct contact each other, wherein the two coupled forks have bevels along all the four edges facing outwards, and wherein each fork has a "V" shaped seat on the upper face.

2. The automatic guided vehicle, according to claim 1, wherein each fork has a tapered tip portion on its lower face.

3. The automatic guided vehicle according to claim 1, wherein each fork comprises a photocell for core searching, placed integral with the base of the fork on the external face and facing frontally in a direction parallel to the fork, wherein the photocells for core searching of the forks are respectively arranged on the opposite forks, one in correspondence with the upper face of the forks and the other one in correspondence with the lower face of the forks.

4. The automatic guided vehicle according to claim 1, wherein at least one of the forks comprises, on the lower face near the base, a photocell for detecting the forked core reading in a vertical downward direction the presence of the core.

5. The automatic guided vehicle according to claim 1, wherein each fork comprises a photocell for pole detection to detect the presence of the pole of a transverse reel, the photocell for pole detection being positioned on the forks in the V seat and facing upwards.

6. The automatic guided vehicle according to claim 1, wherein the equipment comprises at least one photocell lateral to the forks, located in an external position with respect to the same, wherein said at least one lateral photocell is installed, movable in height, on the fork carriage, or fixed in height on a vehicle frame.

7. The automatic guided vehicle according to claim 1, wherein a pair of photocells for checking the transverse reel shape is placed in the lower area of the fork carriage, integral with the fork carriage or to the forks, and facing frontally.

8. The automatic guided vehicle according to claim 1, wherein a photocell for reading the transverse reel diameter is positioned in the center of the equipment.

9. The automatic guided vehicle according to claim 1, wherein a pair of load cells is placed on board the equipment between the fork carriage and the actuators for tilting the plate.

10. A method for controlling an automatic guided vehicle for handling reels according to claim 1, wherein a switching step from a configuration for handling a longitudinal reel to a configuration for handling a transversal reel is carried out by automatically bringing the forks from a closed position, with the forks closed and coupled in contact with each other, to an open position, with the forks separated at the gripping distance, and viceversa.

11. The method for controlling an automatic guided vehicle according to claim 10, wherein the configuration for handling a longitudinal reel the picking cycle comprises the step of centring the coupled forks with respect to a hole in the reel with a vertical and horizontal search of the hole in the core until the hole is simultaneously read with both the photocells for core searching and the phase of slowing down the insertion of the coupled forks in the core by reading a photocell for detecting the forked core drowned in at least one fork near the base.

12. The method for controlling an automatic guided vehicle according to claim 9, wherein the calculation of the diameter of the reel is carried out during the picking operation, after having identified, by the photocells for core searching, the hole in the core of the reel.

13. The method for controlling an automatic guided vehicle according to claim 11, wherein in the configuration for handling a longitudinal reel the deposit cycle comprises the step of checking by the photocell for core searching the presence of other reels in the designated location for the deposit, to bring the vehicle to the target, to deposit the reel and to verify the deposit bringing the photocell for core searching to light and/or detecting the absence of load by load cells.

14. The method for controlling an automatic guided vehicle according to claim 10, wherein in the configuration for handling a transverse reel, the picking cycle comprises the step of checking the position of the reel with respect to a pole support by reading a pair of photocells for checking the transversal reel shape which must not detect the reel or its own core, the phase of picking up the reel and the pole and the phase of confirming that the reel has been taken over, provided by the photocells for pole detection and/or by detecting the load by load cells.

15. The method for controlling an automatic guided vehicle according to claim 14, wherein the calculation of the diameter of the reel is carried out at the end of the picking operation by measuring by a reading photocell for reading the transverse reel diameter the distance from the reel circumference.

16. The method for controlling an automatic guided vehicle according to claim 13, wherein in the configuration for handling of a transversal reel the deposit cycle comprises the step of checking by the photocell for core searching the presence of other reels in the location designated for the deposit by detection of the pole, to bring the vehicle on the target, to deposit the reel by lowering the forks and to check that the deposit occurred when the photocells for pole detection no longer read the presence of the pole and/or by detecting the absence of load by load cells.

* * * * *